May 15, 1934.  W. HERMANN  1,958,623
VEHICLE
Filed Feb. 20, 1932
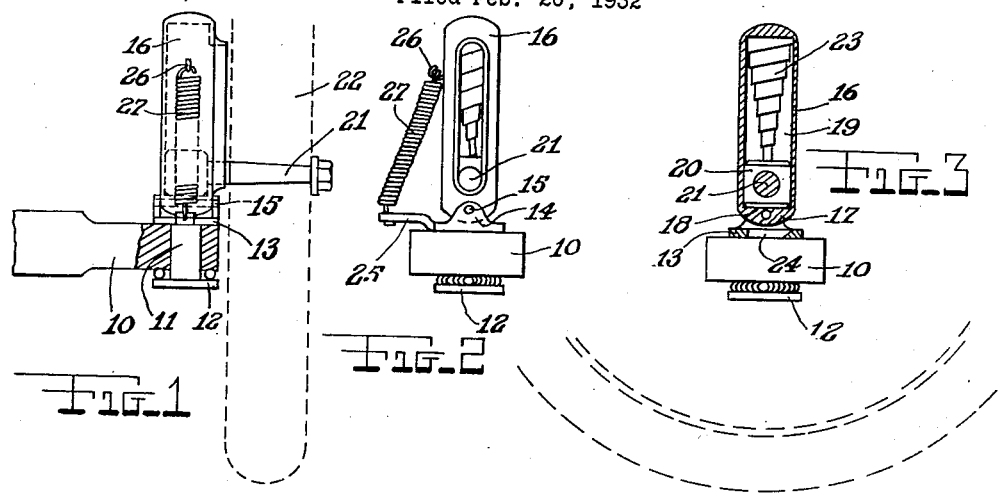
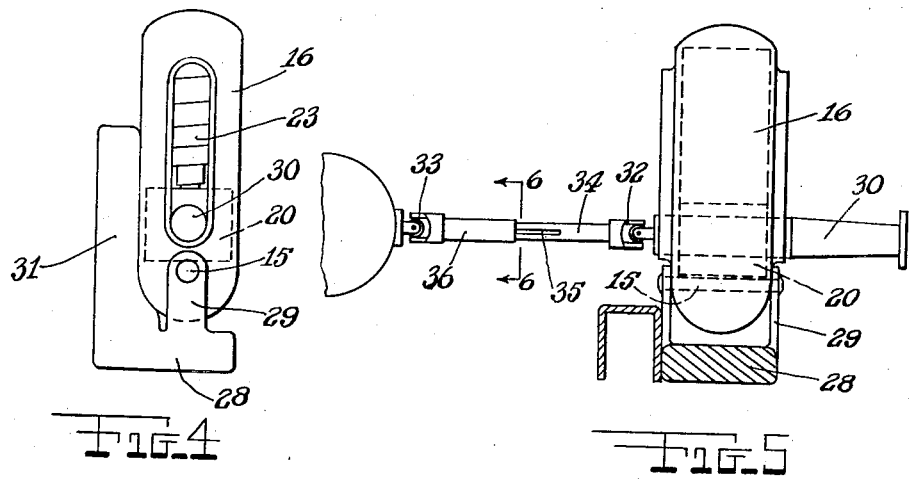
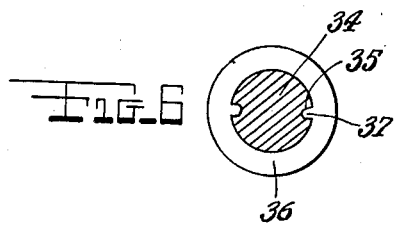
INVENTOR
W. Hermann
BY HIS ATTORNEY F. Lederman Patented May 15, 1934

1,958,623

UNITED STATES PATENT OFFICE 1,958,623

VEHICLE

Walter Hermann, Yonkers, N. Y.

Application February 20, 1932, Serial No. 594,236

11 Claims. (Cl. 267—20)

The main object of this invention is to provide means, particularly for automobiles, whereby the force or shock against a moving vehicle caused by an obstacle lying on the road in the path of the wheel or wheels is compensated for. The ordinary type of spring is capable of but one form of movement, that is, movement in a vertical direction, and the ordinary spring-equipped vehicle lacks means for suitably compensating for that component of resisting force which is caused by the obstacle in a direction directly opposed to the direction of travel of the vehicle. In other words, such an obstacle on the road, as a stone, causes the vehicle, in striking the obstacle, to be momentarily checked in its travel, (by that component of resisting force which acts in the direction opposite to that of travel) and also causes the wheel of the vehicle to ride up on the obstacle and raise the vehicle. The shock caused by the latter is compensated for by the vertical yieldability of the ordinary springs, but no suitable means has heretofore been provided to compensate for the shock directed in the direction opposite to that of travel. Shock absorbers have been designed to partially take up this form of thrust, but they are not completely successful. Such shock, as well as other shocks occasioned by obstacles on the road, are conveyed to the vehicle body through the axle of the wheel and that point on the frame of the vehicle where the axle is attached. This invention aims to attack this problem at its source, wherefore the device of this invention is mounted at that portion of the frame mentioned above.

The above and other objects will become apparent in the description below in which characters of reference refer to like-named parts in the drawing.

Referring briefly to the drawing, Figure 1 is a front elevational view of the device applied to the front wheel of a vehicle.

Figure 2 is a side elevational view of the same.

Figure 3 is a view similar to Figure 2 with the side wall of the rocking housing and one of the supporting ears of the housing removed.

Figure 4 is an enlarged side elevational view of the device applied to the rear wheel of a vehicle.

Figure 5 is a front elevational view of Figure 4, partly in section, showing also the manner of connecting the rear wheel axle with the frame.

Figure 6 is a cross sectional view taken on line 6—6 of Figure 5.

Referring in detail to the drawing, the numeral 10 represents the conventional arm extending from the usual steering knuckle of the vehicle, and provided with the king pin 11 in its usual place. The latter has an enlarged base 12 upon which the arm 10 rests, with the usual ball bearings lying between the contacting surfaces.

The upper end of the king pin 11 is also enlarged and forms a base 13 on the upper surface of the arm 10. From the opposite sides of the base 13, ears 14 extend integrally upward. A rigid pin 15 joins these ears. A substantially oblong housing 16 is rotatably supported by (that is, vertically hinged, on) the pin 15, the latter passing through the thickened lower end 17 of the housing, the upper surface 18 of the latter being flat and normally horizontal. Hence the housing 16 is pivotally mounted on the frame of the vehicle through the king pin 11 which supports the housing. The housing 16 encloses a chamber 19 in which a solid block 20 is longitudinally slidable. The axle 21 of the front wheel 22 passes through the center of this block, being preferably mounted rigid in the block. A spirally coiled band spring 23 is mounted in the chamber 19 between the roof of the housing and the block 20 normally urging the latter into its lowermost position.

As is apparent, the housing 16 is adapted to swing from side to side about the pin 15; in order to provide for relatively wide swinging to the right (Figure 3) the base 13 is cut out as at 24, to prevent scraping of the bottom of the housing on the base 13. An ear or arm 25 extends integrally from the side of the base 13, as shown in Figure 2, and a hook 26 is attached to the housing 16. A heavy coiled spring 27 is mounted between the end of the ear 25 and the hook 26, for the purpose which will hereinafter become apparent.

In the construction shown in Figures 4, 5, and 6, these details which are similar to the construction shown in Figures 1, 2, and 3, are similarly numbered. The rear wheel is not shown but its axle is indicated by the numeral 30. The numeral 28 represents a portion of the vehicle frame adjacent the rear wheel; it is preferably integrally cast with the frame. The ears 29 are substantially similar to the ears 14 and serve the same purpose. Integral with the frame member 28, and extending upright therefrom, is a stout wall 31, against which the adjacent wall of the housing 16 normally lies.

Each rear wheel shaft or axle 30 is connected to the differential through the media of universal joints 32 and 33. The joint 32 has a solid shaft 34 extending therefrom, this shaft being provided with oppositely-disposed longitudinal recesses 35. The joint 33 has a tubular shaft 36 extending therefrom, the shaft 34 lying slidably in the shaft 36, the latter being provided with lugs 37 riding in recesses 35.

In Figures 4, 5, and 6, which illustrate the device applied to the rear wheels of a vehicle, the wheel axle 30 passes rotatably through the block 20.

The operation of the device is as follows. As is apparent, the front frame of the vehicle is suspended from the king pin flange 12, upon which the frame rests. The housing 16 and base 13 move with the vehicle frame. The wheel axle 21 supports the frame, therefore, through the medium of the spring 23. Normally, the axis of the axle 21 and that of the pin 15 will be in vertical alignment. When in travelling the vehicle strikes a stone or the like in the road, the progress of the wheel will be momentarily hindered, but interia will carry the frame onward for a brief interval. Hence, assuming the axle 21 to be fixed (Figure 2), the arm 10 will move to the left, and housing 16 will rotate in a clockwise direction. At the same time the resulting increased pressure of the axle 21 on the spring 23, will cause the latter to contract, taking up, together with the rotary movement of the housing, the rearwardly directed shock caused by the bump. After the stone has been passed, the respective parts will again assume the position shown. In starting from rest, in the case of rear-drive vehicles at the instant of starting the axle 21 will remain stationary while the frame is being pushed forward from behind by the rear wheels. This will cause a slight swinging in a clockwise direction of the housing at the front wheels. To reduce the possibly resultant shock or displacement of the frame with respect to the front wheels, the spring 27 has been provided, this spring normally resisting a clockwise movement of the housing with respect to the frame, or arm 10.

Likewise, as mentioned, the rear portion 28 of the vehicle frame would tend to remain stationary for an instant after the rear wheels have started to rotate to propel the vehicle from rest. Hence, for an instant, the housing 16 (Figure 4) would tend to move in a counterclockwise direction; to prevent any displacement in a counterclockwise direction of the housing with respect to the frame, the wall 31 has been provided so that housing 16 rests against it in normal position.

When clockwise displacement of the rear wheels with respect to the vehicle frame occurs, the shaft connecting the rear wheels with the differential, obviously, must be flexed. Therefore the construction shown in Figures 5, and 6, has been provided. The operation of this structure is believed obvious.

Obviously, modifications in form and structure may be made without departing from the spirit of the invention.

I claim:

1. In a vehicle, a housing vertically hinged on the frame of the vehicle, the axis of the hinge extending at substantially right angles to the direction of travel of the vehicle, a block slidable in said housing, the wheel shaft extending from said block, said housing being rotatable about its hinge in a direction opposite to the direction of travel of the vehicle.

2. In a vehicle, a housing pivotally mounted and vertically hinged on the frame of the vehicle, a block slidable in said housing, the wheel shaft extending from said block, and means resiliently urging said block to one end of said housing.

3. In a vehicle, a housing pivotally mounted and vertically hinged on the frame of the vehicle, a block slidable in said housing, the wheel shaft extending from said block, and means resiliently resisting rotation of said housing in one direction.

4. In a vehicle, a base secured to the frame of the vehicle, upright ears extending from said base, a normally upright housing pivotally supported by said ears, a block slidable in said housing, the wheel shaft extending from said block, and means resiliently urging said block toward one end of said housing.

5. In a vehicle, a base secured to the frame of the vehicle, upright ears extending from said base, a pin rigidly supported in said ears, a normally upright housing rotatably mounted on said pin between said ears, a block slidable in said housing, the wheel shaft extending from said block, and means resiliently urging said block toward one end of said housing.

6. In a vehicle, a base secured to the frame of the vehicle, said base having a cut-out portion therein, upright ears extending from said base, a pin rigidly supported in said ears, a normally upright housing rotatably mounted on said pin between said ears, a block slidable in said housing, said housing having a longitudinal slot the wheel shaft extending from said block through said slot, and resilient means normally urging said block toward one side of said housing.

7. In a vehicle, a housing pivotally mounted and vertically hinged on the frame of the vehicle and having resilient means mounted therein, the wheel axle being secured to said resilient means, said pivotally mounted housing and resilient means combined providing means for permitting independent movement vertically upward and horizontally rearward of said axle, or in any angular direction lying between these two extremes in the same plane.

8. In a vehicle, an arm rigid with the frame of the vehicle, a vertical pin horizontally rotatably mounted in said arm, said pin being enlarged at both its top and its bottom ends, said top end being provided with ears oppositely-disposed thereon, a horizontal pin mounted in said ears and extending over said top end of the vertical pin, an elongated housing vertically rotatably mounted on said horizontal pin, resilient means mounted in said housing, a block slidable in said housing and secured to said resilient means, said block having the wheel axle of the vehicle passing therethrough, said resilient means normally urging said block towards said horizontal pin, said structure permitting said wheel axle to move independently vertically upward and horizontally backward, or in any angular direction between these two extremes in the same plane.

9. In a vehicle, an arm rigid with the frame of the vehicle, a vertical pin horizontally rotatably mounted in said arm, said pin being enlarged at both its top and its bottom ends, said top end being provided with ears oppositely-disposed thereon, a horizontal pin mounted in said ears and extending over said top end of the vertical pin, an elongated housing vertically rotatably mounted on said horizontal pin, resilient means mounted in said housing, a block slidable in said housing and secured to said resilient means, said block having the wheel axle of the vehicle passing therethrough, said resilient means normally urging said block towards said horizontal pin, said structure permitting said wheel axle to move independently vertically upward and horizontally backward, or in any angular direction between these two extremes in the same plane, said housing having a longitudinal slot therein, said axle extending through said slot.

10. A suspension for vehicles having the characteristic that the resilient suspending means are so hinged to the frame of the vehicle to permit said suspending means to move either vertically upward or horizontally backward against the direction of travel of the vehicle, or in any direction in the same plane lying between the first-mentioned two directions as extremes, and consisting of a base secured to the frame of the vehicle, a normally upright housing pivotally supported on said hinge and having a longitudinal slot therein, said housing being pivotable in a rearward direction about said hinge from the normally upright position to a position approximately at right angles to said upright position, a block slidable in said housing, the wheel shaft extending from said block through said slot, resilient means urging said block toward one end of the housing, said housing, said block, and said wheel shaft swinging in unison about said hinge.

11. In a vehicle, a housing pivotally mounted and vertically hinged on the frame of the vehicle, the axes of the vertical hinging and the pivotal mounting of the housing lying at right-angles to each other, a block slidable in said housing, the wheel shaft extending from said block, and means resiliently urging said block toward one end of said shaft.

WALTER HERMANN.